United States Patent
Zhang et al.

(10) Patent No.: US 11,539,229 B2
(45) Date of Patent: Dec. 27, 2022

(54) MULTI-STAGE CONSTANT CURRENT CHARGING METHOD AND CHARGING APPARATUS

(71) Applicant: GUANGDONG OPPO MOBILE TELECOMMUNICATIONS CORP., LTD., Guangdong (CN)

(72) Inventors: Jun Zhang, Guangdong (CN); Chunying Qu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 240 days.

(21) Appl. No.: 16/699,687

(22) Filed: Dec. 1, 2019

(65) Prior Publication Data

US 2020/0106284 A1 Apr. 2, 2020

Related U.S. Application Data

(63) Continuation of application No. PCT/CN2018/089321, filed on May 31, 2018.

(51) Int. Cl.
*H02J 7/00* (2006.01)
*H01M 10/44* (2006.01)
(Continued)

(52) U.S. Cl.
CPC ......... *H02J 7/00714* (2020.01); *H01M 10/44* (2013.01); *H02J 7/0013* (2013.01);
(Continued)

(58) Field of Classification Search
CPC .... H02J 7/00714; H02J 7/0013; H02J 7/0047; H02J 7/0071; H02J 7/007182; H02J 7/04; H01M 10/44
(Continued)

(56) References Cited

U.S. PATENT DOCUMENTS 5,508,598 A * 4/1996 Al-Abassy ............ H02J 7/0086
320/129
6,087,810 A * 7/2000 Yoshida ................ H02J 7/0071
320/139
(Continued)

FOREIGN PATENT DOCUMENTS

CN 101953015 1/2011
CN 101640296 9/2011
(Continued)

OTHER PUBLICATIONS

EPO, Communication for EP Application No. 18921148.5, dated Jul. 28, 2021.
(Continued)

*Primary Examiner* — John T Trischler
(74) *Attorney, Agent, or Firm* — Hodgson Russ LLP

(57) ABSTRACT

Provided are a multi-stage constant current charging method and a charging apparatus. The multi-stage constant current charging method includes the following. Perform a multi-stage constant-current charging on a battery, where a constant-current charging cut-off voltage is larger than a second voltage. Perform a constant-voltage charging on the battery, where a constant-voltage charging cut-off current is larger than a second current.

20 Claims, 6 Drawing Sheets

(51) Int. Cl.
*H02J 7/04* (2006.01)
*H02J 1/04* (2006.01)
*H02J 3/10* (2006.01)
*H02J 50/80* (2016.01)

(52) U.S. Cl.
CPC .......... *H02J 7/0047* (2013.01); *H02J 7/0071* (2020.01); *H02J 7/007182* (2020.01); *H02J 7/04* (2013.01); *H02J 1/04* (2013.01); *H02J 3/10* (2013.01); *H02J 7/00036* (2020.01); *H02J 50/80* (2016.02); *H02J 2207/20* (2020.01)

(58) Field of Classification Search
USPC .................................................. 320/108, 160
See application file for complete search history.

(56) References Cited

U.S. PATENT DOCUMENTS

| | | | | |
|---|---|---|---|---|
| 6,104,165 | A * | 8/2000 | Miyamoto | H01M 10/44 320/125 |
| 6,107,782 | A * | 8/2000 | Imai | H01M 10/44 320/150 |
| 6,803,746 | B2 * | 10/2004 | Aker | H02J 7/022 320/139 |
| 7,202,635 | B2 * | 4/2007 | Patino | H02J 7/04 320/160 |
| 7,880,445 | B2 * | 2/2011 | Hussain | H02J 7/0071 320/164 |
| 7,986,128 | B2 * | 7/2011 | Kubota | H02J 7/0013 320/124 |
| 8,030,902 | B2 * | 10/2011 | Kung | H01M 10/441 320/160 |
| 8,035,347 | B2 * | 10/2011 | Umetsu | H02J 7/0044 320/148 |
| 8,159,191 | B2 * | 4/2012 | Chang | F03D 9/25 320/136 |
| 8,222,870 | B2 * | 7/2012 | Guo | H01M 10/441 320/162 |
| 8,258,757 | B2 * | 9/2012 | Chang | H02J 7/00718 320/162 |
| 8,288,995 | B2 * | 10/2012 | Jimbo | H02J 7/008 320/126 |
| 8,305,045 | B2 * | 11/2012 | Maeagawa | H02J 7/008 320/162 |
| 8,610,408 | B2 * | 12/2013 | Nakai | H01M 4/525 320/160 |
| 8,643,342 | B2 * | 2/2014 | Mehta | H02J 7/0071 320/160 |
| 8,754,614 | B2 * | 6/2014 | Paryani | H02J 7/007184 320/162 |
| 8,796,996 | B2 * | 8/2014 | Nakatsuji | H02J 7/0071 320/134 |
| 8,912,762 | B2 * | 12/2014 | Suzuki | H01M 4/525 320/160 |
| 8,970,182 | B2 * | 3/2015 | Paryani | H02J 7/00 320/162 |
| 9,030,051 | B2 * | 5/2015 | Muratov | H02J 50/12 307/104 |
| 9,142,993 | B2 * | 9/2015 | Kawai | H02J 7/04 |
| 9,158,325 | B1 * | 10/2015 | Lim | G01K 7/16 |
| 9,178,380 | B2 * | 11/2015 | Kawai | H02J 7/045 |
| 9,246,344 | B2 * | 1/2016 | Suzuki | H01M 10/44 |
| 9,368,995 | B2 * | 6/2016 | Nishino | H01M 10/46 |
| 9,419,450 | B2 * | 8/2016 | Paryani | H02J 7/007 |
| 9,531,441 | B2 * | 12/2016 | Bae | H01F 38/14 |
| 9,531,444 | B2 * | 12/2016 | Bae | H02J 50/80 |
| 9,537,539 | B2 * | 1/2017 | Bae | H02J 7/00304 |
| 9,627,719 | B2 * | 4/2017 | Jung | H02J 7/00714 |
| 9,728,991 | B2 * | 8/2017 | Jagenstedt | H02J 7/0071 |
| 9,917,458 | B2 * | 3/2018 | Lee | H02J 7/00 |
| 10,090,700 | B2 * | 10/2018 | Zhang | H02M 3/33515 |
| 10,103,562 | B2 * | 10/2018 | Lee | H02J 7/007182 |
| 10,128,677 | B2 * | 11/2018 | Tian | H02J 7/0071 |
| 10,148,129 | B2 * | 12/2018 | Asanuma | H02J 50/12 |
| 10,181,745 | B2 * | 1/2019 | Zhang | H01F 27/425 |
| 10,199,868 | B2 * | 2/2019 | Nakano | H02J 50/80 |
| 10,199,872 | B2 * | 2/2019 | Jung | H04B 5/0037 |
| 10,211,659 | B2 * | 2/2019 | Tian | H01M 10/44 |
| 10,270,269 | B2 * | 4/2019 | Zhang | H02J 7/0044 |
| 10,283,993 | B2 * | 5/2019 | Deng | H02J 7/0047 |
| 10,291,046 | B2 * | 5/2019 | Ravi | H02J 7/0069 |
| 10,326,298 | B2 * | 6/2019 | Lee | H02J 50/12 |
| 10,340,727 | B2 * | 7/2019 | Zhang | H02M 3/156 |
| 10,389,151 | B2 * | 8/2019 | Ravi | H02J 7/0069 |
| 10,389,155 | B2 * | 8/2019 | Deng | H02J 7/007 |
| 10,404,083 | B2 * | 9/2019 | Zhang | H02J 7/00 |
| 10,411,496 | B2 * | 9/2019 | Zhang | H02J 7/00043 |
| 10,424,953 | B2 * | 9/2019 | Zeng | H02J 7/00 |
| 10,424,958 | B2 * | 9/2019 | Tian | H01M 10/44 |
| 10,461,550 | B2 * | 10/2019 | Zeng | H04M 19/08 |
| 10,461,568 | B2 * | 10/2019 | Zhang | G01R 31/3842 |
| 10,536,006 | B2 * | 1/2020 | Zhang | H01M 10/441 |
| 10,541,541 | B2 * | 1/2020 | Zhang | H02J 7/0071 |
| 10,547,196 | B2 * | 1/2020 | Jung | H02J 7/045 |
| 10,644,520 | B2 * | 5/2020 | Yang | H01M 10/486 |
| 10,673,261 | B2 * | 6/2020 | Zeng | H04M 19/08 |
| 10,727,687 | B2 * | 7/2020 | Zhang | H02J 7/0044 |
| 10,826,303 | B2 * | 11/2020 | Zhang | H02J 7/00714 |
| 10,886,766 | B2 * | 1/2021 | Luo | H01M 10/44 |
| 10,916,951 | B2 * | 2/2021 | Zhang | H02J 7/00714 |
| 10,992,160 | B2 * | 4/2021 | Zhang | H02J 7/0091 |
| 10,998,751 | B2 * | 5/2021 | Wan | H02J 7/00045 |
| 10,998,752 | B2 * | 5/2021 | Jung | H02J 7/007 |
| 11,025,082 | B2 * | 6/2021 | Lee | H02J 7/045 |
| 11,056,896 | B2 * | 7/2021 | Zhang | H02J 7/0047 |
| 11,056,900 | B2 * | 7/2021 | Dang | H02J 7/0071 |
| 11,070,076 | B2 * | 7/2021 | Zhang | H02M 3/33569 |
| 2002/0167295 | A1 * | 11/2002 | Yamashita | H02J 7/007194 320/150 |
| 2003/0006734 | A1 * | 1/2003 | You | H02J 7/0071 320/125 |
| 2004/0090209 | A1 * | 5/2004 | Nishida | H02J 7/007182 320/149 |
| 2004/0195996 | A1 * | 10/2004 | Nishida | H02J 7/0071 320/103 |
| 2005/0200331 | A1 * | 9/2005 | Patino | H02J 7/04 320/128 |
| 2007/0188134 | A1 * | 8/2007 | Hussain | H01M 10/44 320/114 |
| 2008/0122400 | A1 * | 5/2008 | Kubota | H02J 7/00036 320/150 |
| 2008/0218130 | A1 * | 9/2008 | Guo | H01M 10/482 320/162 |
| 2008/0309293 | A1 * | 12/2008 | Kung | H01M 10/441 320/160 |
| 2009/0027012 | A1 * | 1/2009 | Umetsu | H02J 7/0044 320/148 |
| 2009/0027013 | A1 * | 1/2009 | Odaohhara | H02J 7/0068 320/160 |
| 2010/0253278 | A1 * | 10/2010 | Chang | B60W 20/13 320/101 |
| 2010/0327810 | A1 * | 12/2010 | Jimbo | H02J 7/007182 320/126 |
| 2011/0012563 | A1 * | 1/2011 | Paryani | H02J 7/0021 320/162 |
| 2011/0156661 | A1 * | 6/2011 | Mehta | H02J 7/0071 320/160 |
| 2011/0210695 | A1 * | 9/2011 | Kubo | H02J 7/04 320/107 |
| 2011/0267009 | A1 * | 11/2011 | Nakatsuji | H01M 10/48 320/152 |
| 2011/0279079 | A1 * | 11/2011 | Do Valle | H02J 7/0071 320/107 |
| 2011/0285359 | A1 * | 11/2011 | Chang | H02J 7/00718 320/162 |
| 2011/0316487 | A1 * | 12/2011 | Nakai | H01M 4/525 320/160 |
| 2012/0086406 | A1 * | 4/2012 | Maeagawa | H02J 7/008 320/162 |

(56) References Cited

U.S. PATENT DOCUMENTS

| | | | | |
|---|---|---|---|---|
| 2012/0126750 A1* | 5/2012 | Morina | H02J 7/0013 | 320/116 |
| 2012/0133338 A1* | 5/2012 | Suzuki | H01M 4/525 | 320/160 |
| 2012/0169284 A1* | 7/2012 | Park | H02J 7/04 | 320/112 |
| 2013/0063079 A1* | 3/2013 | Kawai | H02J 7/04 | 320/107 |
| 2013/0147279 A1* | 6/2013 | Muratov | H02J 7/00036 | 307/104 |
| 2013/0154578 A1* | 6/2013 | Kawai | H02J 7/04 | 320/164 |
| 2013/0181539 A1* | 7/2013 | Muratov | H01F 38/14 | 307/104 |
| 2013/0335034 A1* | 12/2013 | Suzuki | H01M 4/525 | 320/160 |
| 2014/0132225 A1* | 5/2014 | Jagenstedt | H02J 7/0071 | 320/160 |
| 2014/0253023 A1* | 9/2014 | Paryani | H02J 7/00 | 320/107 |
| 2014/0375279 A1* | 12/2014 | Nishino | H01M 10/44 | 320/160 |
| 2015/0028819 A1* | 1/2015 | Yau | H02J 7/007182 | 320/157 |
| 2015/0077058 A1* | 3/2015 | Jung | H02J 7/008 | 320/112 |
| 2015/0130417 A1* | 5/2015 | Song | H02J 7/007184 | 320/112 |
| 2015/0171644 A1* | 6/2015 | Paryani | H02J 7/045 | 320/137 |
| 2015/0263638 A1* | 9/2015 | Yang | H02M 7/04 | 363/125 |
| 2015/0301552 A1* | 10/2015 | Lim | G01K 7/16 | 327/538 |
| 2015/0340881 A1* | 11/2015 | Nakano | H02J 7/025 | 307/104 |
| 2016/0020620 A1* | 1/2016 | Lee | H02J 7/008 | 320/162 |
| 2016/0064967 A1* | 3/2016 | Lee | H02J 7/00712 | 320/112 |
| 2016/0239070 A1* | 8/2016 | Oto | H02J 50/10 | |
| 2016/0268833 A1* | 9/2016 | Lee | H02J 7/045 | |
| 2017/0040843 A1* | 2/2017 | Asanuma | H02J 7/025 | |
| 2017/0054328 A1* | 2/2017 | Jung | H02J 50/10 | |
| 2017/0093189 A1* | 3/2017 | Zeng | H02J 7/0047 | |
| 2017/0098942 A1* | 4/2017 | Zeng | H02J 7/02 | |
| 2017/0104359 A1* | 4/2017 | Jung | H02J 7/0047 | |
| 2017/0104373 A1* | 4/2017 | Bae | H02J 7/00304 | |
| 2017/0117728 A1* | 4/2017 | Zhang | H02J 7/0044 | |
| 2017/0187215 A1* | 6/2017 | Noda | B60L 58/10 | |
| 2017/0229877 A1* | 8/2017 | Zhang | H02J 7/0027 | |
| 2017/0271903 A1* | 9/2017 | Tian | H02J 7/0069 | |
| 2017/0338670 A1* | 11/2017 | Zhang | H02M 1/08 | |
| 2018/0019611 A1* | 1/2018 | Zhang | H02J 7/0071 | |
| 2018/0026472 A1* | 1/2018 | Zhang | H02J 7/045 | 320/145 |
| 2018/0048163 A1* | 2/2018 | Deng | H02J 7/0047 | |
| 2018/0102658 A1* | 4/2018 | Zhang | H02J 7/063 | |
| 2018/0123376 A1* | 5/2018 | Zhang | H02J 7/007 | |
| 2018/0123383 A1* | 5/2018 | Tian | G01R 31/3842 | |
| 2018/0145526 A1* | 5/2018 | Ravi | H02J 7/007 | |
| 2018/0145527 A1* | 5/2018 | Ravi | H02J 7/045 | |
| 2018/0248385 A1* | 8/2018 | Zhang | H02M 3/33569 | |
| 2018/0269697 A1* | 9/2018 | Zhang | H02J 7/00036 | |
| 2018/0278070 A1* | 9/2018 | Zhang | H02J 7/007 | |
| 2018/0316206 A1* | 11/2018 | Luo | H01M 10/0525 | |
| 2018/0331561 A1* | 11/2018 | Zhang | H02J 7/04 | |
| 2018/0331562 A1* | 11/2018 | Zhang | H02J 7/0045 | |
| 2018/0331612 A1* | 11/2018 | Zhang | H02J 7/00036 | |
| 2019/0036351 A1* | 1/2019 | Tian | H04M 19/08 | |
| 2019/0089166 A1* | 3/2019 | Deng | H02J 7/0047 | |
| 2019/0089174 A1* | 3/2019 | Zeng | H04M 19/08 | |
| 2019/0123570 A1* | 4/2019 | Tian | H02J 7/00712 | |
| 2019/0165613 A1* | 5/2019 | Jung | H02J 50/10 | |
| 2019/0229538 A1* | 7/2019 | Zhang | H02J 7/045 | |
| 2019/0237974 A1* | 8/2019 | Dang | H02J 7/0071 | |
| 2019/0305580 A1* | 10/2019 | Lee | H02J 7/025 | |
| 2019/0312446 A1* | 10/2019 | Zeng | H02J 7/0044 | |
| 2019/0356153 A1* | 11/2019 | Wan | H02J 7/0029 | |
| 2019/0356154 A1* | 11/2019 | Wan | H02J 7/00 | |
| 2019/0363556 A1* | 11/2019 | Zhang | H02J 7/02 | |
| 2020/0021129 A1* | 1/2020 | Lin | H02J 7/00034 | |
| 2020/0106276 A1* | 4/2020 | Zhang | H02J 7/00302 | |
| 2020/0106286 A1* | 4/2020 | Tian | H02J 7/0047 | |
| 2020/0112178 A1* | 4/2020 | Jung | H02J 7/00714 | |
| 2020/0235601 A1* | 7/2020 | Chen | H02J 7/00714 | |
| 2020/0280216 A1* | 9/2020 | Pei | H02J 7/007182 | |
| 2020/0343757 A1* | 10/2020 | Tian | H02J 7/00032 | |
| 2020/0366116 A1* | 11/2020 | Yang | H02J 7/00714 | |
| 2021/0012174 A1* | 1/2021 | Ono | H02J 50/12 | |
| 2021/0066947 A1* | 3/2021 | Du | H02J 7/00711 | |
| 2021/0143661 A1* | 5/2021 | Xu | H01M 10/44 | |
| 2021/0194287 A1* | 6/2021 | Qu | H04B 5/0037 | |
| 2021/0242706 A1* | 8/2021 | Qu | H02J 7/007182 | |
| 2021/0288526 A1* | 9/2021 | Lee | H02J 50/80 | |
| 2021/0296910 A1* | 9/2021 | Zhang | H02J 7/0013 | |
| 2021/0313820 A1* | 10/2021 | Yang | H02J 7/00309 | |
| 2021/0336465 A1* | 10/2021 | Tian | H02J 7/007182 | |

FOREIGN PATENT DOCUMENTS

| | | | | |
|---|---|---|---|---|
| CN | 102237558 | | 11/2011 | |
| CN | 103700901 | | 4/2014 | |
| CN | 104092254 | | 10/2014 | |
| CN | 104753158 A | * | 7/2015 | |
| CN | 105186053 | | 12/2015 | |
| CN | 105186053 B | * | 1/2018 | |
| CN | 107808987 | | 3/2018 | |
| CN | 108023130 | | 5/2018 | |
| CN | 108023130 A | * | 5/2018 | |
| CN | 109888420 A | * | 6/2019 | |
| EP | 2605363 | | 6/2013 | |
| EP | 3068017 | | 9/2016 | |
| EP | 3133746 | | 2/2017 | |
| JP | 2002010514 | | 1/2002 | |
| JP | 2003274570 A | * | 9/2003 | |
| JP | 2005185060 | | 7/2005 | |
| JP | 2007097397 A | * | 4/2007 | |
| JP | 2008136278 | | 6/2008 | |
| JP | 2009033825 | | 2/2009 | |
| JP | 2009033843 A | * | 2/2009 | |
| JP | 2013131426 | | 7/2013 | |
| JP | 2013131426 A | * | 7/2013 | |
| JP | 2013153562 | | 8/2013 | |
| JP | 2016152722 | | 8/2016 | |
| KR | 20140109086 A | * | 9/2014 | |
| KR | 20150054464 A | * | 5/2015 | H02J 7/00 |
| KR | 20170139614 | | 12/2017 | |
| RU | 2010134764 | | 2/2013 | |
| RU | 2526854 | | 8/2014 | |
| WO | WO-2014012394 A1 | * | 1/2014 | H01M 10/44 |
| WO | 2015033666 | | 3/2015 | |
| WO | 2016043099 | | 3/2016 | |
| WO | 2017133383 | | 8/2017 | |
| WO | 2017133388 | | 8/2017 | |
| WO | 2017134838 | | 8/2017 | |

OTHER PUBLICATIONS

JPO, Office Action for JP Application No. 2020-530354, dated Jul. 30, 2021.
IPOS, Office Action for SG Application No. 11201910919W, dated Nov. 18, 2020.
IPA, Office Action for AU Application No. 2018423071, dated Oct. 23, 2020.
EPO, Office Action for EP Application No. 18921148.5, dated Jun. 2, 2020.
IPO, Office Action for IN Application No. 201917049529, dated Jun. 16, 2020.
FSIP, Office Action for RU Application No. 2019139941-07, dated May 29, 2020.

(56) References Cited

OTHER PUBLICATIONS

IPOS, Office Action for SG Application No. 11201910919W, dated May 19, 2020.
EPO, Communication for EP Application No. 18921148.5, dated Feb. 23, 2021.
KIPO, Final Office Action for KR Application No. 10-2020-7015746, dated May 4, 2022.
JPO, Office Action for JP Application No. 2020-530354, dated Mar. 22, 2022.
ISDEC, Office Action for CA Application No. 3061923, dated Feb. 9, 2022.
IPOS, Office Action for SG Application No. 11201910919W, dated Dec. 21, 2021.
KIPO, Office Action for KR Application No. 10-2020-7015746, dated Nov. 18, 2021.
CNIPA, First Office Action for CN Application No. 201880019213.5, dated Jan. 7, 2022.

* cited by examiner

MULTI-STAGE CONSTANT CURRENT CHARGING METHOD AND CHARGING APPARATUS

CROSS-REFERENCE TO RELATED APPLICATION

This application is a continuation application of International Application No. PCT/CN2018/089321, filed on May 31, 2018, the entire disclosure of which is incorporated herein by reference.

TECHNICAL FIELD

This disclosure relates to the field of charging technology, and more particularly to a charging method and a charging apparatus.

BACKGROUND

A battery cell is usually charged in a constant-current and constant-voltage manner. In other words, the battery cell is first charged in a constant-current manner, and when a voltage across the battery cell reaches a standard constant-current charging cut-off voltage, proceed to a constant-voltage charging stage. In the constant-voltage charging stage, the battery cell is charged with a high voltage (that is, the standard constant-current charging cut-off voltage). As the charging process proceeds, a charging current of the battery cell gradually decreases. When the charging current of the battery cell reaches a standard constant-voltage charging cut-off current, charging is completed.

In the above charging process, the constant-voltage charging stage usually takes a long time, which results in a low charging speed of the battery cell.

SUMMARY

In a first aspect of the present disclosure, a charging method is provided. The charging method includes the following. Perform a constant-current charging on a battery. The constant-current charging includes multiple charging stages, where each of the multiple charging stages corresponds to a charging current, and for any two adjacent charging stages, a charging current corresponding to a former charging stage is larger than a charging current corresponding to a later charging stage; in each of the multiple charging stages, apply a charging current corresponding to the charging stage to the battery until a voltage across the battery reaches a first voltage, where the first voltage is larger than a second voltage of the battery. Perform a constant-voltage charging on the battery until a charging current of the battery of the battery reaches a first current, where the first current is larger than a second current of the battery.

According to a second aspect of the present disclosure, a charging apparatus is provided. The charging apparatus includes a power supply circuit and a charging control circuit. The power supply circuit is configured to provide a charging power. The charging control circuit is configured to: perform a constant-current charging on a battery according to the charging power provided by the power supply circuit; perform a constant-voltage charging on the battery according to the charging power provided by the power supply circuit until a charging current of the battery reach a first current, where the first current is larger than a second current of the battery. The constant-current charging includes multiple charging stages, where each of the multiple charging stages corresponds to a charging current, and for any two adjacent charging stages, a charging current corresponding to a former charging stage is larger than a charging current corresponding to a later charging stage; in each of the multiple charging stages, apply a charging current corresponding to the charging stage to the battery until a voltage across the battery reaches a first voltage, where the first voltage is larger than a second voltage of the battery.

DETAILED DESCRIPTION

Figure 1:
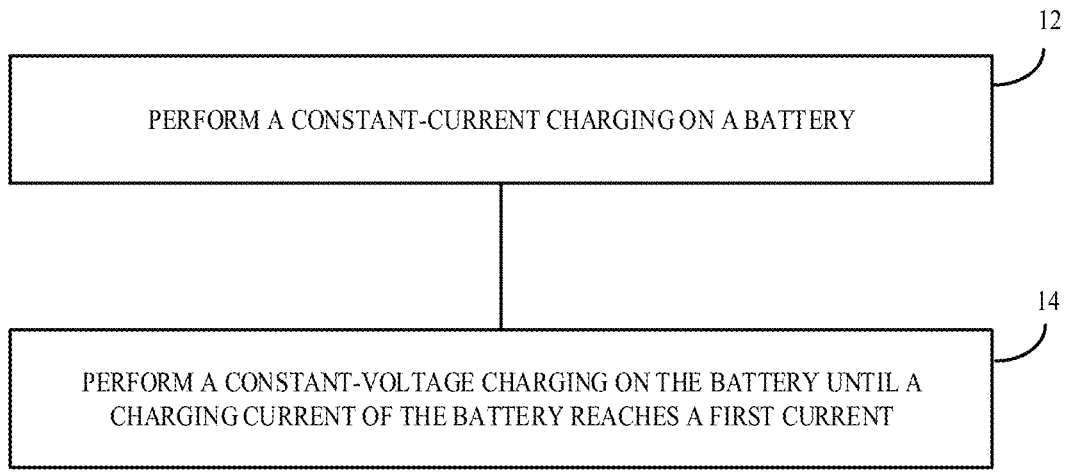
FIG. 1 is a schematic flowchart of a charging method according to an implementation of the present disclosure.

The "battery" referred to herein may be a lithium battery. The lithium battery may be an ordinary lithium-ion battery or a polymer lithium-ion battery.

The "battery" referred to herein may include one battery cell or multiple battery cells. The "battery cell" may sometimes be referred to as "battery pack" or "cell".

The first voltage may also be referred to as "target constant-current limited charging voltage."

The second voltage may also be referred to as "recommended constant-current limited charging voltage" or "well-known constant-current limited charging voltage". The value of the second voltage depends on the type of the battery or the battery cell, which is not limited herein.

As an example, an anode of the battery cell is made of graphite, soft carbon, or hard carbon, a cathode of the battery cell is made of lithium cobalt oxide, lithium manganate, lithium nickel cobaltate, or lithium nickel cobalt manganese oxide, and accordingly the standard constant-current charging cut-off voltage of the battery cell can be 4.2~5.0V (volt).

For example, the anode of the battery cell is made of graphite, and the cathode of the battery cell is made of lithium cobalt oxide, and accordingly the standard constant-current charging cut-off voltage of the battery cell can be 4.40V or 4.45V.

As another example, the anode of the battery cell is made of graphite, and the cathode of the battery cell is made of lithium iron phosphate, and accordingly the standard constant-current charging cut-off voltage of the battery cell can be 3.6~3.8V, for example, 3.7V.

The first current may also be referred to as "target constant-current limited charging current."

The second current may also be referred to as "recommended constant-voltage limited charging current" or "well-known constant-voltage limited charging current". The magnitude of the second current may be, for example, 0.01~0.1 C (coulomb).

The battery cell is usually charged in a constant-current and constant-voltage manner. Specifically, the battery cell is first charged in a constant-current manner until a voltage across the battery cell reaches the standard constant-current charging cut-off voltage. Then the battery cell is charged with the standard constant-current charging cut-off voltage in a constant-voltage manner. When the charging process proceeds, a charging current of the battery cell gradually decreases. When the charging current of the battery cell reaches the standard constant-voltage charging cut-off current, charging is completed.

In a constant-current charging stage, the voltage across the battery cell usually includes two parts: one is a stable voltage between a positive electrode and a negative electrode of the battery cell, the other is a voltage caused by internal resistance and/or polarization of the battery cell. In a constant-voltage charging stage, the charging current gradually decreases, and the voltage caused by internal resistance and/or polarization of the battery cell also gradually decreases. When the charging current of the battery cell is decreased to the standard constant-voltage charging cut-off current, the voltage caused by internal resistance and/or polarization of the battery cell will be low enough to be ignored, and the voltage across the battery cell reaches approximately the standard constant-current charging cut-off voltage.

However, the constant-voltage charging stage in the above charging manner usually takes a long time, which results in a low charging speed of the battery cell. In addition, in the constant-voltage charging stage, the battery is always in a high-voltage state, which will shorten a service life of the battery. If the constant-voltage charging stage is removed with only the constant-current charging stage left, it will be difficult to control the battery cell to be fully charged. Therefore, it is necessary to improve the conventional constant-voltage and constant-current charging manner to increase a charging speed in the constant-voltage and constant-current manner.

FIG. 1 is a schematic flowchart of a charging method according to an implementation of the present disclosure. The charging method illustrated in FIG. 1 includes operations at block 12 to block 14, which will be described in detail in the following.

At block 12, perform a constant-current charging on a battery. The constant-current charging includes multiple charging stages, where each of the multiple charging stages corresponds to a charging current (also referred to as "charge rate"), and for any two adjacent charging stages, a charging current (also referred to as "charge rate") corresponding to a former charging stage is larger than a charging current (also referred to as "charge rate") corresponding to a later charging stage. In each of the multiple charging stages, a charging current corresponding to the charging stage is applied to the battery until a voltage across the battery reaches a first voltage, which is also referred to as a target constant-current charging cut-off voltage, where the first voltage is larger than a second voltage, which is also referred to as a standard constant-current charging cut-off voltage of the battery.

At block 14, perform a constant-voltage charging on the battery until a charging current of the battery reaches a first current, also referred to as a target constant-voltage charging cut-off current, where the first current is larger than a second current, also referred to as a standard constant-voltage charging cut-off current of the battery. A voltage used in the constant-voltage charging can be, for example, the above constant-current charging cut-off voltage, that is, the constant-current charging cut-off voltage can be directly used as a charging voltage for a constant-voltage charging stage. As an example, an anode of the battery is made of graphite, soft carbon, or hard carbon, a cathode of the battery is made of lithium cobalt oxide, lithium manganate, lithium nickel cobaltate, or lithium nickel cobalt manganese oxide, and accordingly the standard constant-current charging cut-off voltage of the battery can be 4.2~5.0V. For example, the anode of the battery is made of graphite, and the cathode of the battery is made of lithium cobalt oxide, and accordingly the standard constant-current charging cut-off voltage of the battery can be 4.40V or 4.45V. As another example, the anode of the battery is made of graphite, and the cathode of the battery is made of lithium iron phosphate, and accordingly the standard constant-current charging cut-off voltage of the battery can be 3.6~3.8V, for example, 3.7V. In some implementations, a voltage used in the constant-voltage charging stage can also be higher or lower than the constant-current charging cut-off voltage according to actual needs, as long as the voltage used in the constant-voltage charging stage is higher than a voltage across the battery (not including a polarization voltage of the battery) when the constant-current charging stage is completed, which is not limited in implementations of the disclosure.

By adopting the charging method provided in implementations of the disclosure, the constant-current charging cut-off voltage in the constant-current charging and a constant-voltage charging cut-off current in the constant-voltage charging can be increased, such that the constant-current charging stage can be prolonged and the constant-voltage charging stage can be shortened to increase a charging speed of the battery. On the other hand, in implementations of the disclosure, the constant-current charging is implemented as multi-stage constant-current charging. Compared with a traditional constant-current charging in which only a single current is adopted, based on the multi-stage constant-current charging, the constant-current charging stage can be further prolonged and the constant-voltage charging stage can be further shortened, thereby further increasing the charging speed of the battery. To summarize, the charging method provided herein can achieve the following advantageous effects. Without decreasing a charging power of the battery, the constant-voltage charging stage can be shortened, thereby increasing the charging speed. In addition, a shorter constant-voltage charging stage will lead to a shorter time period of charging with a high voltage, which can prolong a service life of the battery.

The magnitude of the target constant-current charging cut-off voltage is not limited in implementations of the disclosure. The target constant-current charging cut-off voltage can be configured according to the type of the battery, an expected charging speed, or the like. In an implementation, the target constant-current charging cut-off voltage can be configured as follows. A voltage difference $\Delta V$ between the target constant-current charging cut-off voltage and the standard constant-current charging cut-off voltage satisfies $0<\Delta V<0.2V$.

The magnitude of the target constant-voltage charging cut-off current is not limited in implementations of the disclosure. The target constant-voltage charging cut-off current can be configured according to the type of the battery, an expected charging speed, an expected fully-charged battery power, or the like. In an implementation, the target constant-voltage charging cut-off current is configured such that a power of the battery reaches a battery capacity of the battery after the constant-voltage charging is completed.

The expression "reach" means "be approximately equal to" and does not require that the power of the battery be completely equal to the battery capacity of the battery. As an example, a standard capacity of the battery is $Q_0$. The target constant-voltage charging cut-off current can be configured such that an actual capacity of the battery $Q_z$ satisfies $0.98 Q_0<Q_z<1.02 Q_0$ when the constant-voltage charging stage is completed.

In an implementation, the target constant-voltage charging cut-off current is configured as follows. A ratio N of the target constant-voltage charging cut-off current to the standard constant-voltage charging cut-off current of the battery satisfies $1<N<40$, where N can be an integer or a decimal.

The battery in implementations illustrated in FIG. 1 can include one battery cell or multiple battery cells, such as multiple battery cells coupled in series. If the battery includes multiple battery cells, the battery in implementations illustrated in FIG. 1 can be any one of the multiple battery cells. The voltage across the battery can be comprehended as the voltage across one battery cell, accordingly, the first voltage, the second voltage, the first current, and the second current of the battery can be comprehended as the first voltage, the second voltage, the first current, and the second current of one battery cell.

The manner of determining whether the voltage across the battery reaches the target constant-current charging cut-off voltage can be various. For example, whether the voltage across the battery reaches the target constant-current charging cut-off voltage can be predicted according to how long the battery has been charged. For another example, the voltage across the battery can be continuously monitored with a monitoring circuit to determine whether the voltage across the battery reaches the target constant-current charging cut-off voltage.

Similarly, the manner of determining whether the charging current of the battery reaches the target constant-voltage charging cut-off current can be various. For example, whether the charging current of the battery reaches the target constant-voltage charging cut-off current can be predicted according to how long the battery has been charged. For another example, the charging current of the battery can be continuously monitored with a monitoring circuit to determine whether the charging current of the battery reaches the target constant-voltage charging cut-off current.

Figure 2:
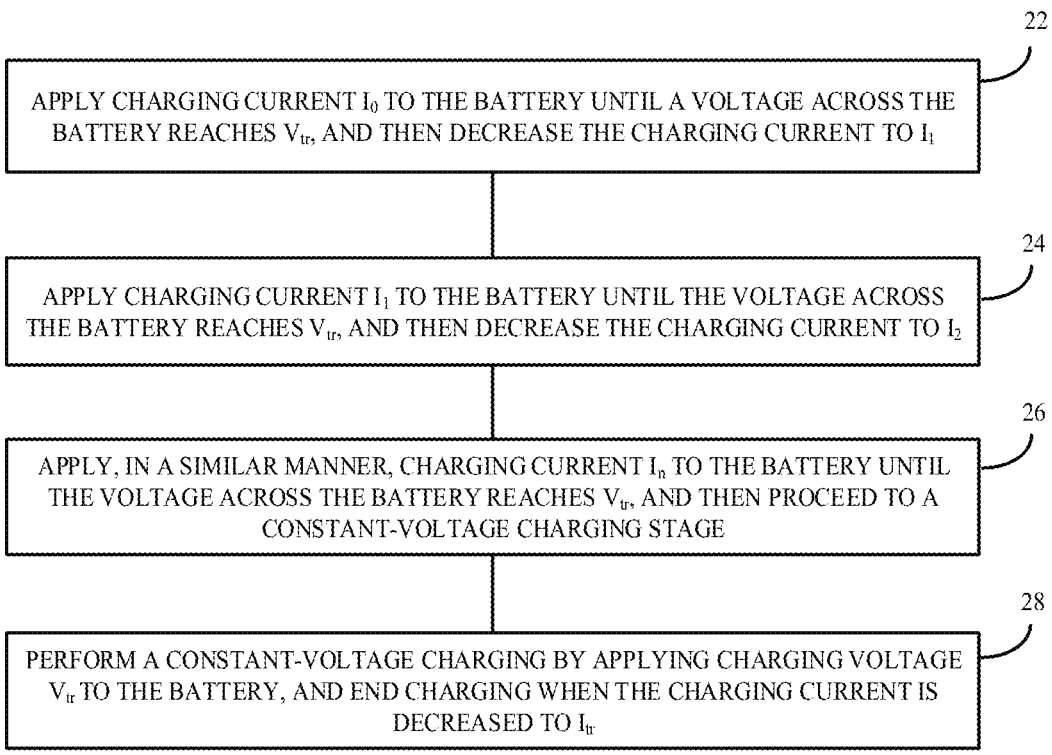
FIG. 2 is an exemplary diagram of the charging method according to an implementation of the present disclosure.
Figure 3:
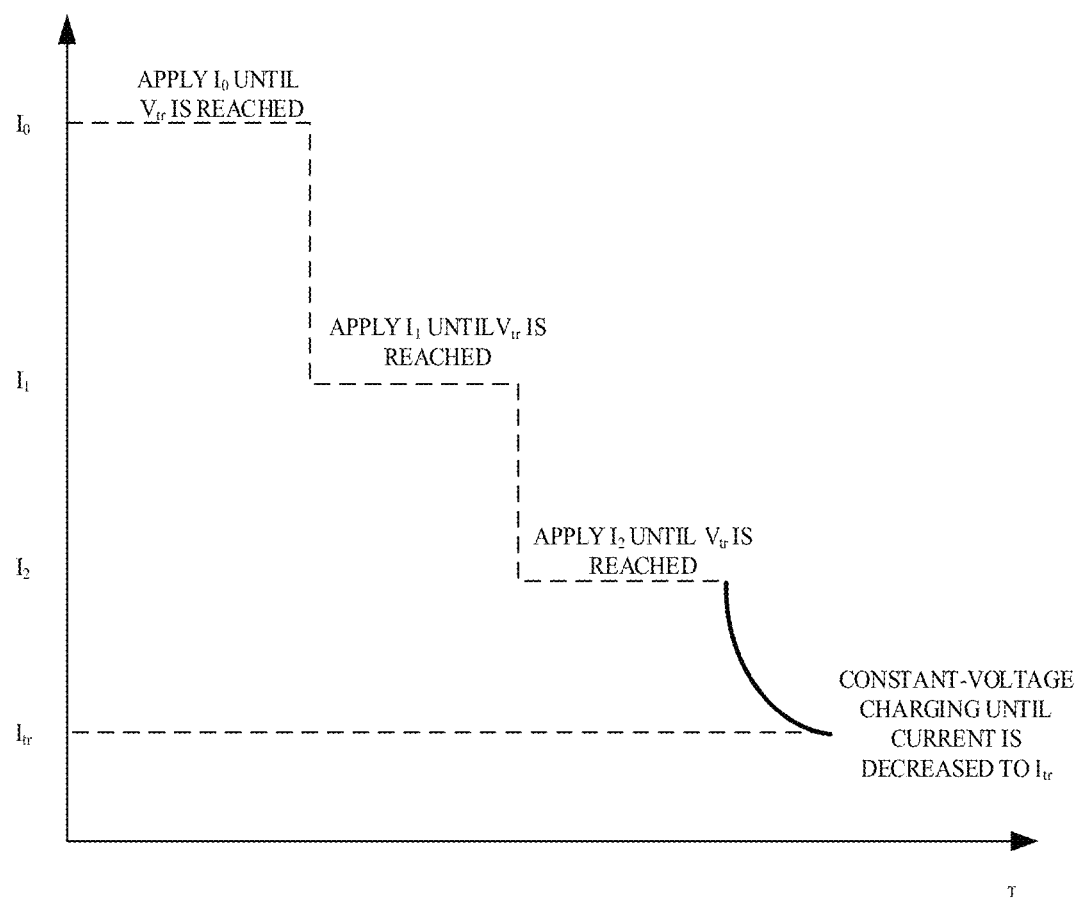
FIG. 3 is an exemplary diagram illustrating charging stages of the charging method according to an implementation of the present disclosure.
Figure 4:
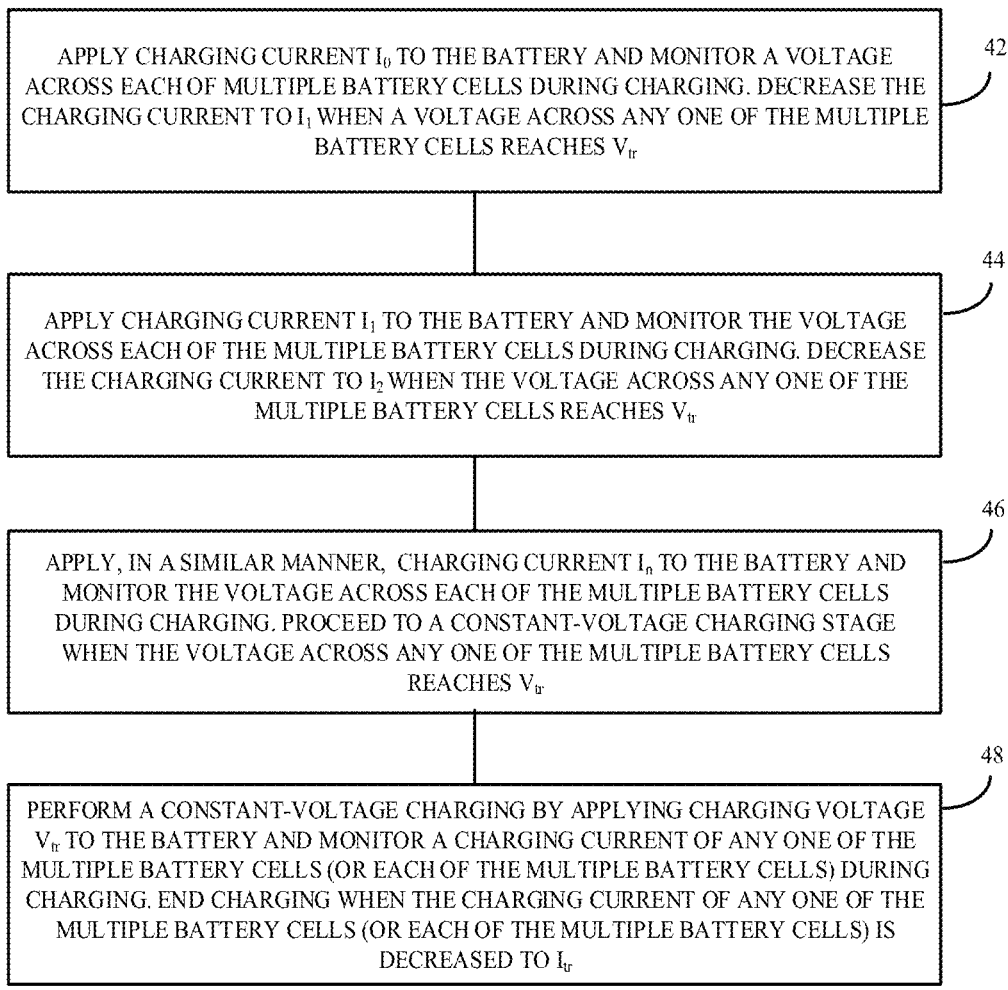
FIG. 4 is an exemplary diagram of the charging method according to another implementation of the present disclosure.

The following will describe in further detail the charging method provided in implementations of the disclosure with examples in connection with FIG. 2 to FIG. 4.

FIG. 2 is an exemplary diagram of the charging method according to an implementation of the present disclosure. In an example illustrated in FIG. 2, the battery includes a single battery cell. In addition, in the example illustrated in FIG. 2, charging currents $I_0, I_1, I_2 \ldots I_n$ used for the constant-current charging are set for the battery in advance, where $I_0>I_1>I_2>\ldots>I_n$. A charging method illustrated in FIG. 2 includes operations at block 22 to block 28, which will be described below.

At block 22, charging current $I_0$ is applied to the battery until the voltage across the battery reaches $V_{tr}$ ($V_{tr}$ represents the target constant-current charging cut-off voltage), and then the charging current is decreased to $I_1$.

At block 24, charging current $I_1$ is applied to the battery until the voltage across the battery reaches $V_{tr}$, and then the charging current is decreased to $I_2$.

At block 26, in a similar manner, charging current $I_n$ is applied to the battery until the voltage across the battery reaches $V_{tr}$, and then the method proceeds to the constant-voltage charging stage.

At block 28, perform the constant-voltage charging by applying charging voltage $V_{tr}$ to the battery, and charging ends when the charging current is decreased to $I_{tr}$ ($I_{tr}$ represents the constant-voltage charging cut-off current).

In the example illustrated in FIG. 2, the charging current of the battery decreases in a step-like manner from operations at block 22 to operations at block 28. As such, in the constant-current charging, the battery can be charged in a manner of multi-stage constant-current, thereby prolonging the constant-current charging as much as possible. FIG. 3 illustrates current variance in the whole charging process when n is equal to 2.

FIG. 4 is an exemplary diagram of the charging method according to another implementation of the present disclosure. The charging method illustrated in FIG. 4 is similar to that illustrated in FIG. 2. The difference lies in that, in the example illustrated in FIG. 4, the battery includes multiple battery cells coupled in series. The method illustrated in FIG. 4 includes operations at block 42 to block 48, which will be described below.

At block 42, charging current $I_0$ is applied to the battery and a voltage across each of the multiple battery cells is monitored during charging. When a voltage across any one of the multiple battery cells reaches $V_{tr}$, the charging current is decreased to $I_1$.

At block 44, charging current $I_1$ is applied to the battery and the voltage across each of the multiple battery cells is monitored during charging. When the voltage across any one of the multiple battery cells reaches $V_{tr}$, the charging current is decreased to $I_2$.

At block 46, in a similar manner, charging current $I_n$ is applied to the battery and the voltage across each of the multiple battery cells is monitored during charging. When the voltage across any one of the multiple battery cells reaches $V_{tr}$, the method proceeds to the constant-voltage charging stage.

At block 48, perform the constant-voltage charging by applying charging voltage $V_{tr}$ to the battery and a charging current of any one of the multiple battery cells (or each of the multiple battery cells) is monitored during charging. Charging ends when the charging current of any one of the multiple battery cells (or each of the multiple battery cells) is decreased to $I_{tr}$.

It is to be noted that, the scenario to which the charging method illustrated in FIG. 1 is applied is not limited in implementations of the disclosure. The charging method illustrated in FIG. 1 is applicable to a wired charging architecture or a wireless charging architecture. For example, the charging method illustrated in FIG. 1 is applicable to the wired charging architecture and is performed by a power supply device (such as a power adaptor) in the wired charging architecture. For another example, the charging method illustrated in FIG. 1 is applicable to the wireless charging architecture and is performed by a wireless transmitting device (such as a wireless charging base) or a device to-be-charged in the wireless charging architecture. Hereinafter, implementations of the charging method illustrated in FIG. 1 in different charging architectures will be elaborated with examples in connection with specific implementations.

As an example, the charging method illustrated in FIG. 1 can be applied to a wired charging architecture. In the wired charging architecture, the power supply device can be coupled with a device to-be-charged via a charging interface. The type of the charging interface is not limited in implementations of the disclosure. For example, the charging interface may be a universal serial bus (USB) interface or a lightning interface. The USB interface may be a standard USB interface, a micro USB interface, or a Type-C interface.

In the wired charging architecture, the charging method illustrated in FIG. 1 can be performed by the power supply device or the device to-be-charged.

In an implementation, the charging method illustrated in FIG. 1 is performed by the power supply device. Operations at block 12 include the following. In the constant-current charging, the power supply device communicates with the device to-be-charged via the charging interface and adjusts, according to information fed back by the device to-be-charged, an output current of the power supply device to make the output current of the power supply device match a charging current corresponding to a present charging stage.

The manner of communication, the content communicated, or the master-slave relationship in communication between the power supply device and the device to-be-charged is not limited in implementations of the disclosure. For example, the power supply device can communicate with the device to-be-charged via a data line of the charging interface (such as a D+ line and/or a D− line of the USB interface). The power supply device can perform a one-way communication with the device to-be-charged or perform a two-way communication (such as communication achieved through request(s) and response(s)) with the device to-be-charged. The content communicated between the power supply device and the device to-be-charged (that is, the information fed back by the device to-be-charged) may be, for example, battery state information (such as the voltage across the battery or a power of the battery) or information for instructing the power supply device to increase or decrease its own output current.

In the above implementation, the power supply device adjusts its own output current according to the information fed back by the device to-be-charged to make the output current of the power supply device match the charging current corresponding to the present charging stage. As such, the output current of the power supply device can be directly applied to the battery for direct charging, and it is unnecessary for the device to-be-charged to perform a constant-current control on the charging current of the battery, which is possible to reduce heating of the device to-be-charged.

It is to be understood that, the output current of the power supply device can be a constant direct current (DC) or a current of varying waveform, such as a pulsating DC or an alternating current (AC). As an example, the output current of the power supply device is the current of varying waveform. The expression "the output current of the power supply device matches the charging current corresponding to the present charging stage" means that a peak value or an average value of the output current of the power supply device matches the charging current corresponding to the present charging stage. By charging the battery with the current of varying waveform, polarization of the battery can be reduced, thereby prolonging the service life of the battery.

The manner of setting the output current of the power supply device to the current of varying waveform can be various, and an example is given below.

The power supply device usually includes a switch unit and transformer, a primary circuit on a primary side of the transformer, and a secondary circuit on a secondary side of the transformer. The primary circuit usually includes a rectifying circuit and a filtering circuit. In order to make the power supply device output the current of varying waveform, the filtering circuit in the primary circuit can be removed, such that a voltage of pulsating waveform outputted by the rectifying circuit can be injected into the switch unit and transformer, and energy can be transferred, via the switch unit and transformer, from the primary side to the secondary side.

If the above is implemented, the charging method illustrated in FIG. 1 further includes the following. An input AC is rectified to output a voltage of pulsating waveform. The voltage of pulsating waveform is coupled from the primary side of the transformer to the secondary side of the transformer. The output current of the power supply device is generated according to an output voltage of the transformer.

The output current of the power supply device is adjusted according to the information fed back by the device to-be-charged to make the output current of the power supply device match the charging current corresponding to the present charging stage as follows. The output current of the power supply device is adjusted according to the information fed back by the device to-be-charged to make a peak value or an average value of the output current of the power supply device match the charging current corresponding to the present charging stage.

For the filtering circuit on the primary side, a liquid aluminum electrolytic capacitor is usually used for filtering. However, the liquid aluminum electrolytic capacitor has a large volume and bursts easily. Taking the above into consideration, the filtering circuit on the primary side can be removed, and the voltage of pulsating waveform obtained after rectification is directly injected into the switch unit and transformer, thereby reducing the volume of the power supply device. In addition, since the liquid aluminum electrolytic capacitor on the primary side has a short service life and tends to burst, the liquid aluminum electrolytic capacitor on the primary side can be removed, such that the power supply device can have a longer service life and be safer.

As another example, the charging method illustrated in FIG. 1 can be applied to a wireless charging architecture in which the wireless transmitting device is used for wireless charging.

In this example, the charging method illustrated in FIG. 1 can be performed by the wireless transmitting device or the device to-be-charged.

In an implementation, the charging method illustrated in FIG. 1 is performed by the wireless transmitting device. In this case, operations at block 12 include the following. In the constant-current charging, the wireless transmitting device performs a wireless communication with the device to-be-charged and adjusts, according to information fed back by the device to-be-charged, a transmission power of the wireless transmitting device to make the transmission power of the wireless transmitting device match a charging current corresponding to a present charging stage.

There is no restriction on the manner of communication, the content communicated, or the master-slave relationship between the wireless transmitting device and the device to-be-charged in implementations of the disclosure.

For example, the wireless transmitting device can perform a wireless communication with the device to-be-charged based on Bluetooth, wireless fidelity (Wi-Fi), or backscatter modulation (or power load modulation).

The wireless transmitting device can perform a one-way communication or a two-way communication (such as communication achieved through request(s) and response(s)) with the device to-be-charged. The content communicated between the wireless transmitting device and the device to-be-charged (that is, the information fed back by the device to-be-charged) may be, for example, battery state information (such as the voltage across the battery or a power of the battery) or information for instructing the wireless transmitting device to increase or decrease its own transmission power.

The manner in which the wireless transmitting device adjusts its own transmission power can be various. For example, the wireless transmitting device can be coupled with a power supply device and transmit a wireless charging signal according to an input voltage provided by the power supply device. In this situation, the wireless transmitting device can communicate with the power supply device to instruct the power supply device to adjust the input voltage, thereby adjusting a transmission power of the wireless charging signal. For another example, the wireless transmitting device includes a power adjusting apparatus and is configured to adjust the transmission power of the wireless charging signal by adjusting a duty cycle and/or a frequency of a control signal transmitted by the power adjusting apparatus.

In an implementation, the charging method illustrated in FIG. 1 is performed by the device to-be-charged. The charging method illustrated in FIG. 1 further includes the following. A wireless charging signal received is converted, with a wireless receiving circuit, into an input voltage of a charging line between the wireless receiving circuit and the battery. Operations at block 12 include the following. Decrease, with a step-down circuit, a voltage in the charging line and perform, with a charging management circuit, a constant-current control on a current inputted into the battery.

There is no restriction on the position of the step-down circuit in the charging line in implementations of the disclosure. For example, the step-down circuit can be located between the charging management circuit and the battery or located between the wireless receiving circuit and the charging management circuit.

In this implementation, the device to-be-charged is provided with the step-down circuit. In this way, the wireless charging signal can be transmitted with a high voltage between the wireless transmitting device and the device to-be-charged, which is beneficial to decreasing a current in the wireless receiving circuit, thereby reducing heating of the device to-be-charged.

The step-down circuit can be a step-down circuit having a step-down conversion efficiency higher than that of the charging management circuit and may be, for example, a charge pump.

In an implementation, in order to further reduce heating of the device to-be-charged, the charging method illustrated in FIG. 1 further includes the following. Perform a wireless communication with a wireless transmitting device and instruct the wireless transmitting device to adjust the wireless charging signal according to a voltage difference between an input voltage of the charging management circuit and an output voltage of the charging management circuit, to decrease the voltage difference. Since a conversion efficiency of the charging management circuit has a positive correlation with the voltage difference between the input voltage of the charging management circuit and the output voltage of the charging management circuit, the conversion efficiency of the charging management circuit can be improved by decreasing the voltage difference, thereby further reducing heating of the device to-be-charged.

Method implementations of the disclosure have been described in detail above with reference to FIG. 1 to FIG. 4. The following will describe in detail apparatus implementations of the disclosure with reference to FIG. 5. It is to be understood that, method implementations and apparatus implementations correspond to each other in terms of description. Therefore, for details not elaborated in apparatus implementations, reference can be made to the foregoing method implementations.

Figure 5:
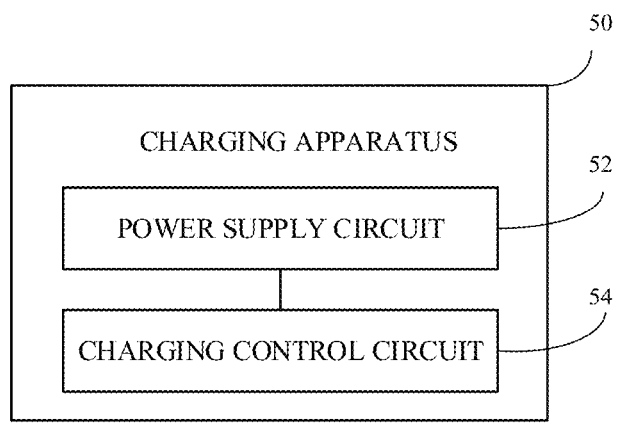
FIG. 5 is a schematic structural diagram of a charging apparatus according to an implementation of the present disclosure.

FIG. 5 is a schematic structural diagram of a charging apparatus according to an implementation of the present disclosure. As illustrated in FIG. 5, the charging apparatus 50 includes a power supply circuit 52 and a charging control circuit 54. The power supply circuit 52 is configured to provide a charging power. The charging management circuit 54 is configured to: perform a constant-current charging on a battery according to the charging power provided by the power supply circuit 52; perform a constant-voltage charging on the battery according to the charging power provided by the power supply circuit 52 until a charging current of the battery reaches a first current (also known as target constant-voltage charging cut-off current), where the first current is larger than a second current (also known as standard constant-voltage charging cut-off current). The constant-current charging includes multiple charging stages, where each of the multiple charging stages corresponds to a charging current, and for any two adjacent charging stages, a charging current corresponding to a former charging stage is larger than a charging current corresponding to a later charging stage; in each of the multiple charging stages, apply a charging current corresponding to the charging stage to the battery until a voltage across the battery reaches a first voltage (also known as target constant-voltage charging cut-off voltage), where the first voltage is higher than a second voltage (also known as standard constant-voltage charging cut-off voltage).

In an implementation, the battery includes multiple battery cells coupled in series. The charging control circuit 54 is further configured to monitor the voltage across each of the battery cells in the constant-current charging.

In an implementation, a voltage difference $\Delta V$ between the target constant-current charging cut-off voltage and the standard constant-current charging cut-off voltage satisfies $1<\Delta V<0.2V$.

In an implementation, a ratio N of the target constant-voltage charging cut-off current to the standard constant-voltage charging cut-off current of the battery satisfies $1<N<40$.

In an implementation, the target constant-voltage charging cut-off current is configured to make a power of the battery reach a battery capacity of the battery after the constant-voltage charging is completed.

It is to be noted that, the scenario to which the charging apparatus 50 is applied is not limited in implementations of the disclosure. The charging apparatus 50 is applicable to a wired charging architecture or a wireless charging architecture. For example, the charging apparatus 50 may be a power supply device (such as a power adaptor) in the wired charging architecture. For another example, the charging apparatus 50 may be a wireless transmitting device (such as a wireless charging base) or a device to-be-charged in the wireless charging architecture. Hereinafter, implementations of the charging apparatus 50 in different charging architectures will be elaborated with examples in connection with FIG. 6 to FIG. 9.

Figure 6:
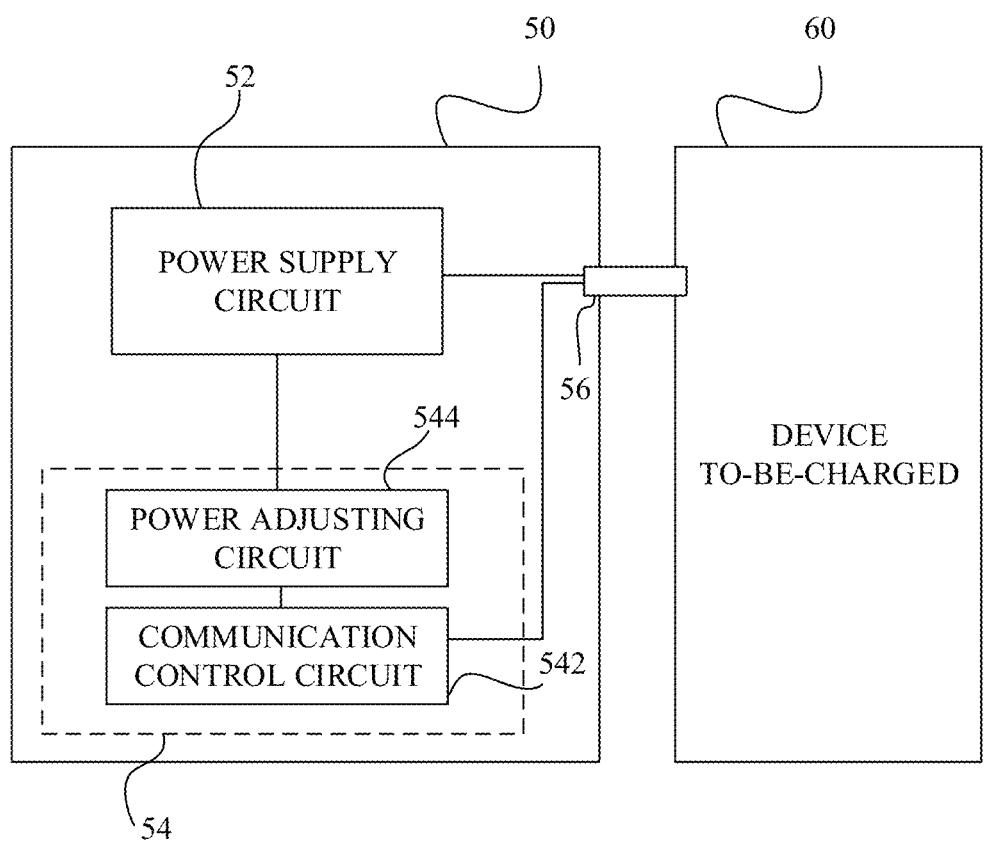
FIG. 6 is an exemplary diagram illustrating a manner in which the charging apparatus is used in a wired charging architecture.

As an example, as illustrated in FIG. 6, the charging apparatus 50 is the power supply device (such as the power adaptor). The charging apparatus 50 can be coupled with a device to-be-charged 60 via a charging interface 56. The type of the charging interface 56 is not limited in implementations of the disclosure. For example, the charging interface 56 may be a USB interface or a lightning interface. The USB interface may be a standard USB interface, a micro USB interface, or a Type-C interface.

As illustrated in FIG. 6, the charging control circuit 54 includes a communication control circuit 542 and a power adjusting circuit 544. The communication control circuit 542 is configured to, in the constant-current charging, communicate with the device to-be-charged 60 via the charging interface 56 and adjust, with the power adjusting circuit 544, an output current of the charging apparatus 50 according to information fed back by the device to-be-charged 60 to make the output current of the charging apparatus 50 match a charging current corresponding to a present charging stage.

The power supply circuit 52 of the charging apparatus 50 can provide the device to-be-charged 60 with the charging power via a power line of the charging interface 56. When the charging interface 56 is the USB interface, the power line can be a VBUS line in the USB interface. The power supply circuit 52 can be implemented in a conventional manner, which is not limited herein. For example, the power supply circuit 52 includes a transformer, a rectifying circuit and a filtering circuit on a primary side of the transformer, and a rectifying circuit and a filtering circuit on a secondary side of the transformer.

The power adjusting circuit 544 can include, for example, a pulse width modulation (PWM) controller, a voltage feedback circuit, and/or a current feedback circuit.

The communication control circuit 542 can be, for example, an MCU or other circuit units with a control function. The manner in which the communication control circuit 542 adjusts the output current of the charging apparatus 50 can be various. For instance, the communication control circuit 542 adjusts a reference voltage and/or a reference current of the voltage feedback circuit and/or the current feedback circuit of the power adjusting circuit 544 to adjust a duty cycle or a frequency of the PWM controller of the power adjusting circuit 544, thereby adjusting the output current of the charging apparatus 50.

The manner of communication, the content communicated, or the master-slave relationship between the communication control circuit 542 and the device to-be-charged 60 is not limited in implementations of the disclosure. For example, the communication control circuit 542 can communicate with the device to-be-charged 60 via a data line of the charging interface 56 (such as a D+ line and/or a D– line of the USB interface). The communication control circuit 542 can perform a one-way communication or a two-way communication (such as communication achieved through request(s) and response(s)) with the device to-be-charged 60. The content communicated between the communication control circuit 542 and the device to-be-charged 60 (that is, the information fed back by the device to-be-charged 60) may be, for example, battery state information (such as the voltage across the battery or a power of the battery) or information for instructing the charging apparatus 50 to increase or decrease its own output current.

In the above implementation, the charging apparatus 50 adjusts its own output current according to the information fed back by the device to-be-charged 60 to make the output current of the charging apparatus 50 match the charging current corresponding to the present charging stage. As such, the output current of the charging apparatus 50 can be directly applied to the battery for direct charging, and it is unnecessary for the device to-be-charged 60 to perform a constant-current control on the charging current of the battery, which is possible to reduce heating of the device to-be-charged.

It is to be understood that, the output current of the charging apparatus 50 can be a constant DC or a current of varying waveform, such as a pulsating DC or an AC. As an example, the output current of the charging apparatus 50 is the current of varying waveform. The expression "the output current of the charging apparatus 50 matches the charging current corresponding to the present charging stage" means that a peak value or an average value of the output current of the charging apparatus 50 matches the charging current corresponding to the present charging stage. By charging the battery with the current of varying waveform, polarization of the battery can be reduced, thereby prolonging the service life of the battery.

The manner of setting the output current of the charging apparatus 50 to the current of varying waveform can be various, and an example is given below.

The power supply circuit 52 of the charging apparatus 50 usually includes a switch unit and transformer, a primary circuit on a primary side of the transformer, and a secondary circuit on a secondary side of the transformer. The primary circuit usually includes a rectifying circuit and a filtering circuit. In order to make the charging apparatus 50 output the current of varying waveform, the filtering circuit in the primary circuit can be removed, such that a voltage of pulsating waveform outputted by the rectifying circuit can be injected into the switch unit and transformer and be transferred, via the switch unit and transformer, from the primary side to the secondary side.

Figure 7:
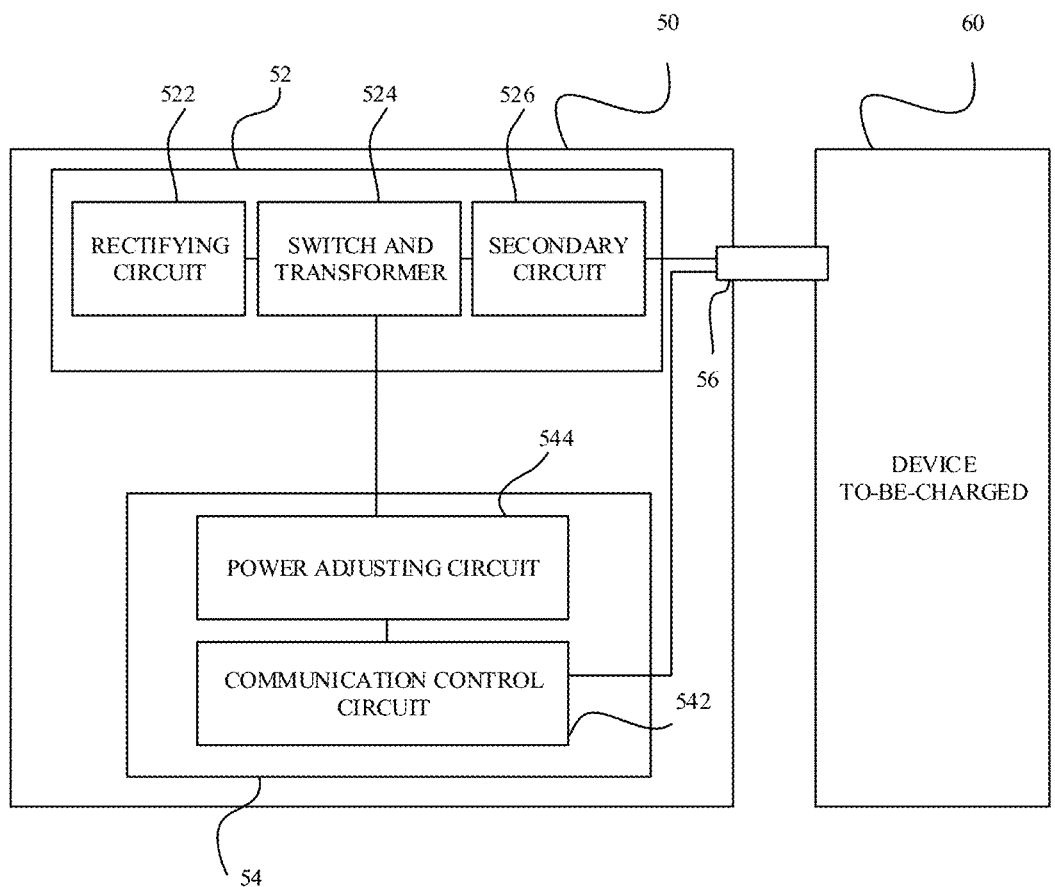
FIG. 7 is another exemplary diagram illustrating a manner in which the charging apparatus is used in a wired charging architecture.

As illustrated in FIG. 7, the power supply circuit 52 includes a rectifying circuit 522, a switch unit (such as a MOS transistor) and transformer 524, and a secondary circuit 526 (including a secondary rectifying circuit and a secondary filtering circuit, for example). The rectifying circuit 522 is configured to rectify an input AC to output a voltage of pulsating waveform. The switch unit and transformer 524 is configured to couple the voltage of pulsating waveform from a primary side of the transformer to a secondary side of the transformer. The secondary circuit 526 is configured to generate the output current of the charging apparatus 50 according to an output voltage of the transformer 524. The communication control circuit 542 is configured to adjust, with the power adjusting circuit 544, the output current of the charging apparatus 50 (such as adjusting, with the power adjusting circuit 544, (that is, a switch-on time and a switch-off time) of the switch unit) according to the information fed back by the device to-be-charged 60 to make a peak value or an average value of the output current of the charging apparatus 50 match the charging current corresponding to the present charging stage.

For the filtering circuit on the primary side, a liquid aluminum electrolytic capacitor is usually used for filtering. However, the liquid aluminum electrolytic capacitor has a large volume and bursts easily. Taking the above into consideration, the filtering circuit on the primary side can be removed, and the voltage of pulsating waveform obtained after rectification is directly injected into the switch unit and transformer, thereby reducing the volume of the power supply device. In addition, since the liquid aluminum electrolytic capacitor on the primary side has a short service life and tends to burst, the liquid aluminum electrolytic capacitor on the primary side can be removed, such that the power supply device can have a longer service life and be safer.

As another example, the charging apparatus 50 can be applied to the wireless charging architecture. In the wireless charging architecture, the charging apparatus 50 can be the wireless transmitting device or the device to-be-charged.

Figure 8:
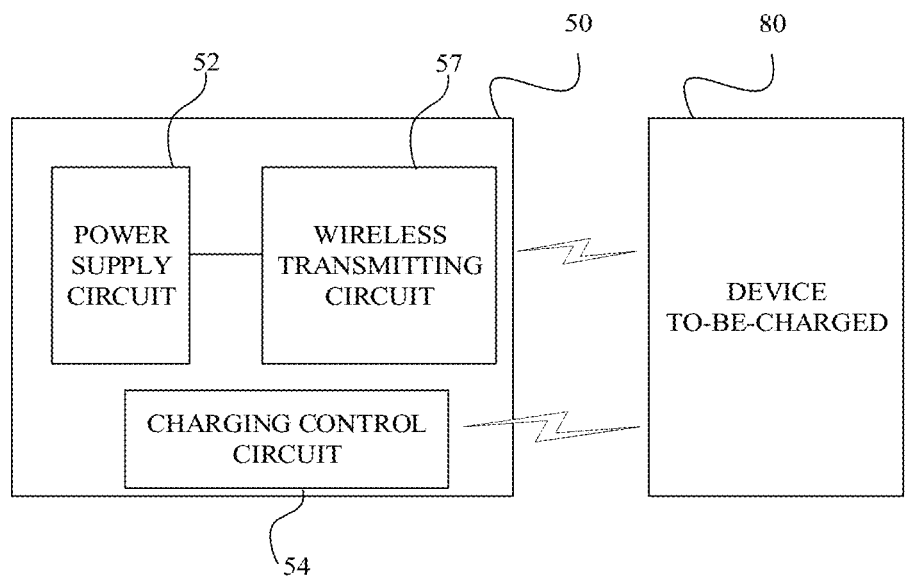
FIG. 8 is an exemplary diagram illustrating a manner in which the charging apparatus is used in a wireless charging architecture.

In an implementation, the charging apparatus 50 is the wireless transmitting device. As illustrated in FIG. 8, the charging apparatus 50 further includes a wireless transmitting circuit 57. The charging control circuit 54 is configured to, in the constant-current charging, perform a wireless communication with a device to-be-charged 80 and adjust, according to information fed back by the device to-be-charged 80, a transmission power of the wireless transmitting circuit 57 to make the transmission power of the wireless transmitting circuit 57 match a charging current corresponding to a present charging stage.

The power supply circuit 52 can be realized in different manners. For instance, the power supply circuit 52 can include a rectifying circuit and a filtering circuit which are configured to convert an AC into an input voltage of the wireless transmitting circuit 57. For another instance, the charging apparatus 50 is coupled with a power supply device (such as a power adaptor, which is not illustrated in FIG. 8) via an interface and provides a power inputted via the interface from the power supply device to the wireless transmitting circuit. In this situation, the power supply circuit 52 can be an interface circuit in the charging apparatus 50 corresponding to an interface configured to be coupled with the power supply device.

The manner in which the charging control circuit 54 is realized and the manner in which the charging control circuit 54 adjusts the transmission power of the wireless transmitting circuit 57 can be various. For example, the charging control circuit 54 includes only a circuit with a communication function. The charging control circuit 54 is configured to receive the information fed back by the device to-be-charged 80 and communicate with the power supply device according to the information fed back by the device to-be-charged 80 to instruct the power supply device to adjust an output voltage and/or an output current, thereby adjusting the transmission power of the wireless transmitting circuit 57. For another example, the charging control circuit 54 includes a communication control circuit and a power adjusting circuit (not illustrated in FIG. 8). The communication control circuit can adjust, according to the information fed back by the device to-be-charged 80, a duty cycle or a frequency of a control signal transmitted by the power adjusting circuit to adjust the transmission power of the wireless transmitting circuit 57.

There is no restriction on the manner of communication, the content communicated, or the master-slave relationship between the charging control circuit 54 and the device to-be-charged 80 in implementations of the disclosure.

For example, the charging control circuit 54 can perform a wireless communication with the device to-be-charged 80 based on Bluetooth, Wi-Fi, or backscatter modulation (or power load modulation).

The charging control circuit 54 can perform a one-way communication or a two way communication (such as communication achieved through request(s) and response(s)) with the device to-be-charged 80. The content communicated between the charging control circuit 54 and the device to-be-charged 80 (that is, the information fed back by the device to-be-charged 80) may be, for example, battery state information (such as the voltage across the battery or a power of the battery) or information for instructing the wireless transmitting device to increase or decrease its own transmission power.

Figure 9:
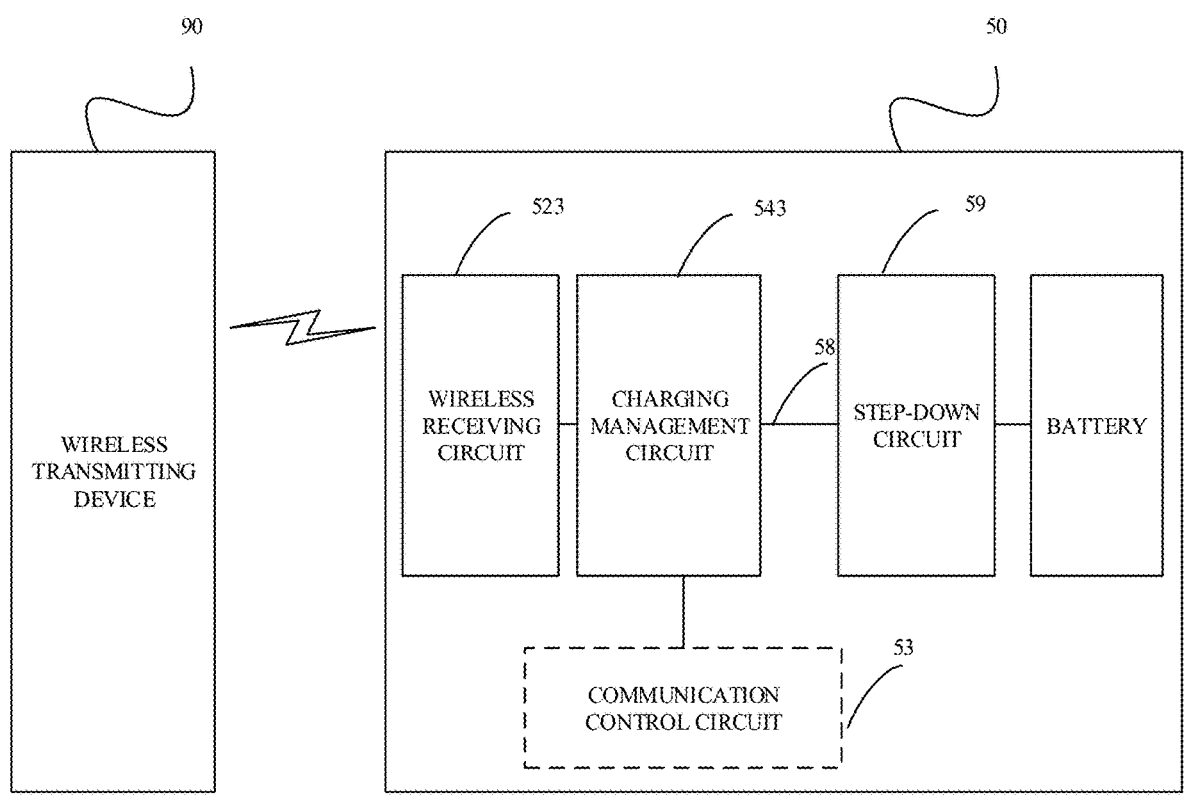
FIG. 9 is another exemplary diagram illustrating a manner in which the charging apparatus is used in a wireless charging architecture.

In an implementation, the charging apparatus 50 is a device to-be-charged. As illustrated in FIG. 9, the power supply circuit includes a wireless receiving circuit 523. The charging control circuit includes a charging management circuit 543. The wireless receiving circuit 523 is configured to convert a wireless charging signal received into an input voltage of a charging line 58 between the wireless receiving circuit 523 and the battery. The charging apparatus 50 further includes a step-down circuit 59. The step-down circuit 59 is configured to decrease a voltage in the charging line 58. The charging management circuit 543 is configured to perform a constant-current control on a current inputted into the battery.

In this implementation, the charging apparatus is provided with the step-down circuit. In this way, the wireless charging signal can be transmitted with a high voltage between the wireless transmitting device and the charging apparatus, which is beneficial to decreasing a current in the wireless receiving circuit, thereby reducing heating of the device to-be-charged.

The step-down circuit 59 can be located between the wireless receiving circuit 523 and the charging management circuit 543 or located between the charging management circuit 543 and the battery.

The step-down circuit 59 can be a step-down circuit having a step-down conversion efficiency higher than that of the charging management circuit 543 and may be, for example, a charge pump.

In an implementation, in order to further reduce heating of the device to-be-charged, the charging apparatus 50 further includes a communication control circuit 53. The communication control circuit 53 is configured to perform a wireless communication with a wireless transmitting device 90 and instruct the wireless transmitting device 90 to adjust the wireless charging signal according to a voltage difference between an input voltage of the charging management circuit 543 and an output voltage of the charging management circuit 543, to decrease the voltage difference.

Since a conversion efficiency of the charging management circuit 543 has a positive correlation with the voltage difference between the input voltage of the charging management circuit 543 and the output voltage of the charging management circuit 543, the conversion efficiency of the charging management circuit 543 can be improved by decreasing the voltage difference, thereby further reducing heating of the device to-be-charged.

In implementations of the present disclosure, the "device to-be-charged" can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcastinghandheld (DVB-H) network), a satellite network, an amplitude modulation-frequency modulation (AM-FM) broadcast transmitter, and/or with another communication terminal. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone capability such as a conventional laptop or a handheld receiver. In some implementations, the device to-be-charged can refer to a mobile terminal device or a handheld terminal device, such as a mobile phone, pad, etc. In other implementations, the device to-be-charged of the disclosure can refer to a system-on-chip, where the battery of the terminal device may or may not belong to the system-on-chip.

The above implementations may be wholly or partially implemented in software, hardware, firmware, or any combination thereof. When implemented in software, the implementations may wholly or partially take the form of computer program products. The computer program product includes one or more computer instructions. When the computer instructions are loaded and executed on a computer, procedures or functions of the implementations of the disclosure can be wholly or partially implemented. The computer may be a general-purpose computer, a special-purpose computer, a computer network, or other programmable apparatuses. The computer instructions may be stored in a computer readable storage medium, or transmitted from one computer readable storage medium to another computer readable storage medium. For example, the computer instructions may be transmitted from one website, computer, server, or data center to another website, computer, server, or data center in a wired manner (such as a coaxial-cable, an optical fiber, a digital subscriber line (DSL)) or a wireless manner (such as infrared, wireless, microwave, or the like). The computer readable storage medium may be any usable medium accessible to the computer, or a storage device (such as a server, a date center, or the like) which includes one or more usable mediums integrated. The usable medium can be a magnetic medium (such as a floppy disk, a hard disk, or a magnetic tape), an optical medium (such as a digital video disc (DVD)), a semiconductor medium (such as a solid state disk (SSD)), or the like.

It will be appreciated that the systems, apparatuses, and methods disclosed in implementations herein may also be implemented in various other manners. For example, the above apparatus implementations are merely illustrative, e.g., the division of is only a division of logical functions, and there may exist other ways of division in practice, e.g., multiple units or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Additionally, various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A charging method, comprising:
    performing a constant-current charging of a battery, wherein the constant-current charging comprises a plurality of charging stages, wherein:
        each of the plurality of charging stages corresponds to a charging current, and for any two adjacent charging stages, a charging current corresponding to a former charging stage is larger than a charging current corresponding to a later charging stage; and
        in each of the plurality of charging stages, apply a charging current corresponding to the charging stage to the battery until a voltage of the battery reaches a first voltage, wherein the first voltage is larger than a second voltage, wherein the second voltage is a standard constant-current charging cut-off voltage of the battery; and
    performing a constant-voltage charging of the battery until a charging current of the battery reaches a first current, wherein the first current is larger than a second current, wherein the second current is a standard constant-voltage charging cut-off current of the battery.

2. The charging method of claim 1, wherein:
    the battery comprises a plurality of battery cells coupled in series; and
    the charging method further comprises:
        monitoring the voltage across each of the plurality of the battery cells in the constant-current charging.

3. The charging method of claim 1, wherein a voltage difference $\Delta V$ between the first voltage and the second voltage satisfies $0<\Delta V<0.2V$.

4. The charging method of claim 1, wherein a ratio N of the first current to the second current satisfies $1<N<40$.

5. The charging method of claim 1, wherein the first current is configured to make a power of the battery reach a battery capacity of the battery after the constant-voltage charging is completed.

6. The charging method of claim 1, wherein the charging method is performed by a wireless transmitting device, and performing the constant-current charging of the battery comprises:
    in the constant-current charging, performing, by the wireless transmitting device, a wireless communication with a device to-be-charged and adjusting, according to information fed back by the device to-be-charged, a transmission power of the wireless transmitting device to make the transmission power of the wireless transmitting device match a charging current corresponding to a present charging stage.

7. The charging method of claim 1, wherein the charging method is performed by a power supply device, and performing the constant-current charging of the battery comprises: in the constant-current charging, communicating, by the power supply device, with a device to-be-charged via a charging interface and adjusting, according to information fed back by the device to-be-charged, an output current of the power supply device to make the output current of the power supply device match a charging current corresponding to a present charging stage.

8. The charging method of claim 7, wherein:
the charging method further comprises:
   rectifying an input alternating current (AC) to output a voltage of pulsating waveform;
   coupling the voltage of pulsating waveform from a primary side of a transformer to a secondary side of the transformer; and
   generating the output current of the power supply device according to an output voltage of the transformer; and
adjusting, according to the information fed back by the device to-be-charged, the output current of the power supply device to make the output current of the power supply device match the charging current corresponding to the present charging stage comprises:
   adjusting, according to the information fed back by the device to-be-charged, the output current of the power supply device to make a peak value or an average value of the output current of the power supply device match the charging current corresponding to the present charging stage.

9. The charging method of claim 1, wherein:
the charging method is performed by a device to-be-charged and further comprises:
   converting, with a wireless receiving circuit, a wireless charging signal received into an input voltage of a charging line between the wireless receiving circuit and the battery; and
performing the constant-current charging of the battery comprises:
   decreasing, with a step-down circuit, a voltage in the charging line; and
   performing, with a charging management circuit, a constant-current control on a current applied to the battery.

10. The charging method of claim 9, further comprising:
performing a wireless communication with a wireless transmitting device and instructing the wireless transmitting device to adjust the wireless charging signal according to a voltage difference between an input voltage of the charging management circuit and an output voltage of the charging management circuit, to decrease the voltage difference.

11. A charging apparatus comprising:
a power supply circuit configured to provide a charging power;
a charging control circuit configured to:
   perform a constant-current charging of a battery according to the charging power provided by the power supply circuit, wherein the constant-current charging comprises a plurality of charging stages, wherein each of the plurality of charging stages corresponds to a charging current, and for any two adjacent charging stages, a charging current corresponding to a former charging stage is larger than a charging current corresponding to a later charging stage; in each of the plurality of charging stages, apply a charging current corresponding to the charging stage to the battery until a voltage across the battery reaches a first voltage, wherein the first voltage is larger than a second voltage, wherein the second voltage is a standard constant-current charging cut-off voltage of the battery; and
   perform a constant-voltage charging of the battery according to the charging power provided by the power supply circuit until a charging current of the battery reaches to a first current, wherein the first current is larger than a second current, wherein the second current is a standard constant-voltage charging cut-off current of the battery.

12. The charging apparatus of claim 11, wherein:
the battery comprises a plurality of battery cells coupled in series; and
the charging control circuit is further configured to:
   monitor the voltage across each of the plurality of the battery cells in the constant-current charging.

13. The charging apparatus of claim 11, wherein a voltage difference $\Delta V$ between the first voltage and the second voltage satisfies $0<\Delta V<0.2V$.

14. The charging apparatus of claim 11, wherein a ratio N of the first current to the second current satisfies $1<N<40$.

15. The charging apparatus of claim 11, wherein the first current is configured to make a power of the battery reach a battery capacity of the battery after the constant-voltage charging is completed.

16. The charging apparatus of claim 11, wherein:
the charging apparatus is a wireless transmitting device; and
the charging apparatus further comprises a wireless transmitting circuit, and the charging control circuit is configured to, in the constant-current charging, perform a wireless communication with a device to-be-charged and adjust, according to information fed back by the device to-be-charged, a transmission power of the wireless transmitting circuit to make the transmission power of the wireless transmitting circuit match a charging current corresponding to a present charging stage.

17. The charging apparatus of claim 11, wherein:
the charging apparatus is a power supply device coupled with a device to-be-charged via a charging interface; and
the charging control circuit comprises a communication control circuit and a power adjusting circuit, wherein the communication control circuit is configured to, in the constant-current charging, communicate with the device to-be-charged via the charging interface and adjust, with the power adjusting circuit, an output current of the charging apparatus according to information fed back by the device to-be-charged to make the output current of the charging apparatus match a charging current corresponding to a present charging stage.

18. The charging apparatus of claim 17, wherein:
the power supply circuit comprises:
   a rectifying circuit configured to rectify an input alternating current (AC) to output a voltage of pulsating waveform;
   a switch unit and transformer configured to couple the voltage of pulsating waveform from a primary side of the transformer to a secondary side of the transformer; and
   a secondary circuit configured to generate the output current of the charging apparatus according to an output voltage of the transformer; and the communication control circuit is configured to:
  adjust, with the power adjusting circuit, the output current of the charging apparatus according to the information fed back by the device to-be-charged to make a peak value or an average value of the output current of the charging apparatus match the charging current corresponding to the present charging stage.

19. The charging apparatus of claim 11, wherein the charging apparatus is a device to-be-charged, the power supply circuit comprises a wireless receiving circuit, the charging control circuit comprises a charging management circuit, and the charging apparatus further comprises a step-down circuit;
  the wireless receiving circuit is configured to convert a wireless charging signal received into an input voltage of a charging line between the wireless receiving circuit and the battery;
  the step-down circuit is configured to decrease a voltage in the charging line; and
  the charging management circuit is configured to perform a constant-current control of a current inputted into the battery.

20. The charging apparatus of claim 19, further comprising:
  a communication control circuit configured to perform a wireless communication with a wireless transmitting device and instruct the wireless transmitting device to adjust the wireless charging signal according to a voltage difference between an input voltage of the charging management circuit and an output voltage of the charging management circuit, to decrease the voltage difference.

* * * * *